May 23, 1967  E. J. PETRICK  3,321,163
PORTABLE MOVIE SCREEN DEVICE
Filed Jan. 29, 1965  2 Sheets-Sheet 1
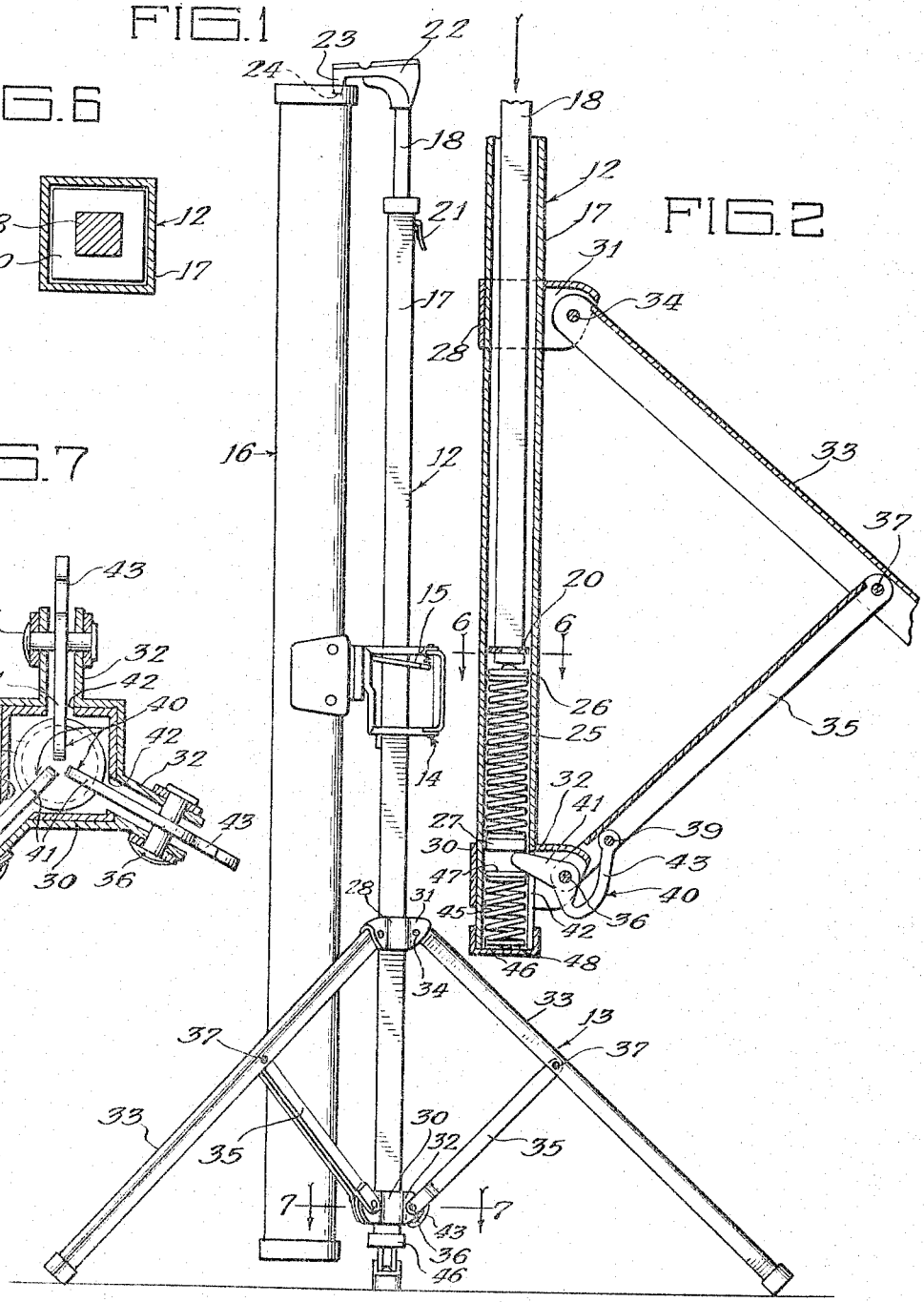
Inventor:
Edward J. Petrick
By: Hofgren, Wegner, Allen,
Stellman & McCord
Attorneys

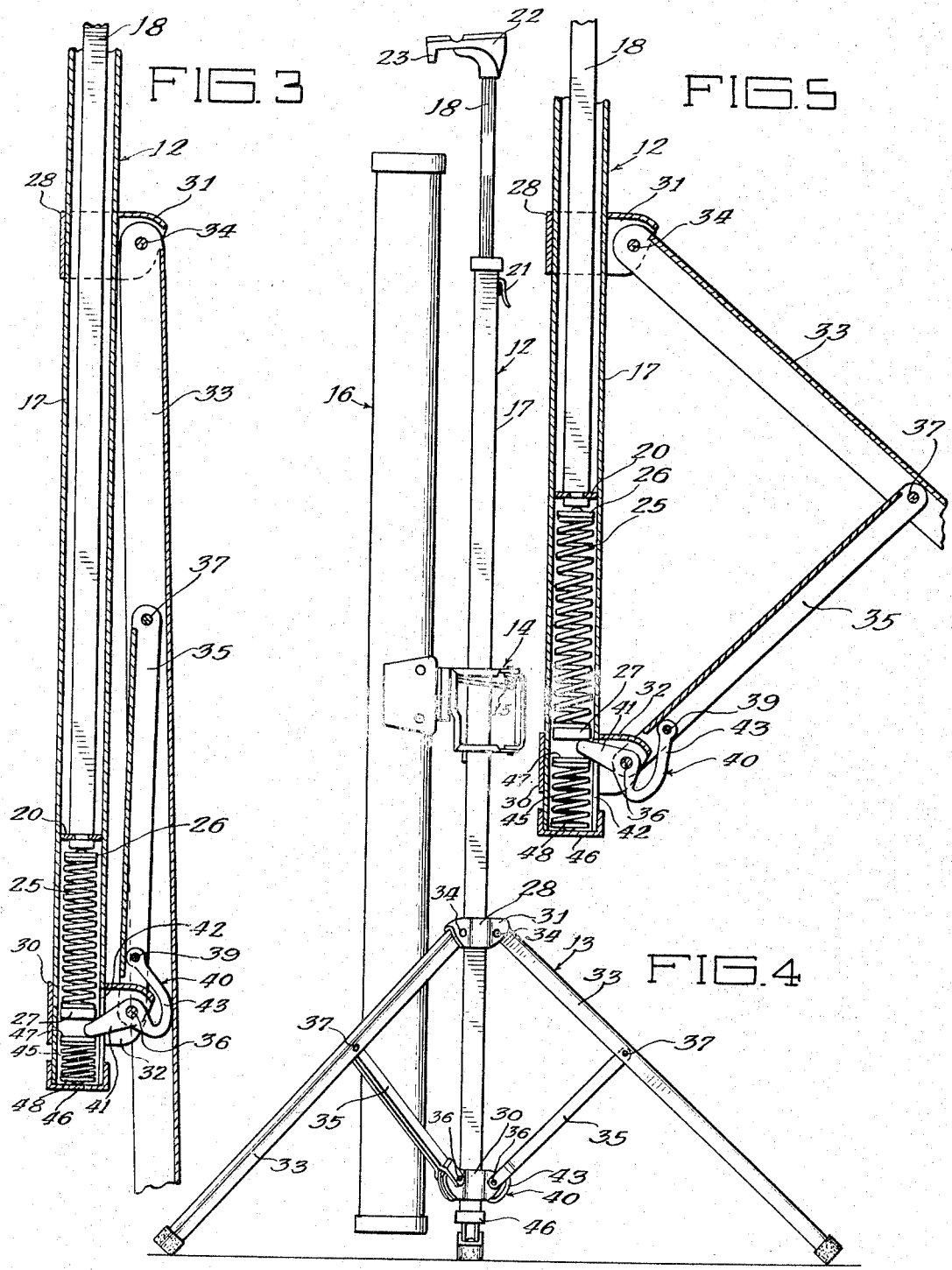

United States Patent Office 3,321,163
Patented May 23, 1967

3,321,163
PORTABLE MOVIE SCREEN DEVICE
Edward J. Petrick, Park Ridge, Ill., assignor to Knox Manufacturing Co., a corporation of Illinois
Filed Jan. 29, 1965, Ser. No. 428,899
2 Claims. (Cl. 248—171)

The present invention relates to a portable movie screen device, and more particularly to a stand for such a screen structure, which stand is constructed and arranged so that the leg unit of the stand is automatically moved from a supporting position to a closed position when the stand is lifted from a supporting surface, and from a closed position to a supporting position when it is desired to put the movie screen device in use.

The present invention is an improvement upon the patent to Lee John Armstrong entitled "Stand for Movie Screen Device," U.S. Patent No. 3,164,348.

The primary object of the present invention is to provide a new and improved stand for a portable movie screen device.

Another object is to provide a new and improved mechanism which will automatically move the leg unit of the stand from supporting position to closed position, and back again to supporting position to obviate the necessity of manually manipulating the leg unit.

A further object is to provide lever members which are secured at one end to the bracing links of a leg unit and are positioned at the opposite end between a pair of compression springs within the stand, one of the compression springs rotating the lever members in a direction to move the leg unit to closed position and the other of the compression springs rotating the lever members in a direction to move the leg unit toward supporting position.

The invention is illustrated in the preferred embodiment in the accompanying drawings in which:

FIGURE 1 is a side elevational view of the portable movie screen device of the present invention showing the leg members of the leg unit in spread supporting position and the extension rod depressed to engage an end of the screen casing and to compress the upper spring at the lower end portion of the standard;

FIGURE 2 is an enlarged fragmentary sectional view of a portion of FIGURE 1 showing a portion of the lower end of the standard and the position of the parts thereof, the inner end of the depressed extension rod compressing the upper spring in the lower end portion of the standard, the leg members of the leg unit remaining in spread supporting position upon a supporting surface because of the weight of the movie screen device and because of the friction between moving parts and between the leg members and the supporting surface;

FIGURE 3 is an enlarged fragmentary sectional view similar to FIGURE 2 showing a portion of the lower end of the standard and the position of the parts thereof after the device of FIGURE 1 has been lifted from a supporting surface with the extension rod in depressed position, the upper spring having exerted downward thrust to rotate the lever means to urge the leg members of the leg unit to closed position adjacent the standard and to compress the lower spring at the lower end portion of the standard;

FIGURE 4 is a view similar to FIGURE 1 but showing the extension rod after being released and urged upwardly by the upper spring so that the lower spring will rotate the lever means and urge the leg unit to spread supporting position, the release and upward movement of the extension rod freeing an end of the screen casing for swingable movement to a position perpendicular to the standard so that the flexible screen rolled up within the casing can be pulled outwardly thereof to viewing position;

FIGURE 5 is an enlarged fragmentary sectional view of a portion of FIGURE 4 showing the position of the parts at the lower end of the standard when the compression of the upper spring has been released by releasing the extension rod to cause the lower spring to rotate the lever means so as to urge the leg unit to spread supporting position;

FIGURE 6 is a sectional view taken as indicated on line 6—6 of FIGURE 2; and

FIGURE 7 is a sectional view taken as indicated on line 7—7 of FIGURE 1.

In the embodiment illustrated, a standard, generally designated 12, is supported in an upright position upon a leg unit, generally designated 13. The standard is provided with a handle member, generally designated 14, which is slidably mounted on the standard 12 and is provided with a latching member 15 for adjustably positioning the handle member 14 vertically of the standard 12.

The forward face of the handle member 14 is formed to provide a mounting surface to which a conventional screen casing, generally designated 16, is pivotally mounted. The screen casing 16, when in storage position, is parallel to the standard 12, as shown in FIGURE 1, and when in operative position is swung 90° to a position perpendicular to the standard 12. The screen casing 16 is conventional and houses a flexible screen upon a spring-urged roller so that the screen may be pulled from the casing to a viewing position.

The standard 12 is preferably formed of a main tubular member 17 and a telescoping extension rod 18, which is slidably received in the tubular member 17 and preferably is guided at its lower end by a guide washer 20 which affords close tolerance with the inner walls of the tubular member 17. The telescoping rod 18 is normally held in varying positions of extended adjustment with respect to the tubular member 17 by a conventional clamping member or Swedish clamp, generally designated 21, located near the upper end of the tubular member 17. The clamping member is preferably spring biased so that it is normally held in clamping position and must be manually released to release and to adjust the telescoping rod 18.

The upper end of the rod 18 carries a bail support 22 from which the free end of a reflective movie screen may be supported in a conventional manner. The bail support 22 is also provided with a depending lug 23 of a size to fit within a well 24 in the end of the casing 16 to hold the casing 16 in its carrying or inoperative position parallel to the standard, as shown in FIGURE 1.

As best seen in FIGURES 2, 3 and 5, a coiled compression spring 25 and a coiled compression spring 45 are preferably positioned one above the other within the lower end of the tubular member 17. The coil spring 25 is provided with a washer 26 secured to its upper end and a washer 27 secured to its lower end to afford guiding and bearing surfaces to the coil spring 25. The function of the coil spring 25 is to cooperate with portions of the leg unit 13, with the coil spring 45, and with the extension rod 18, so that the leg unit 13 can be held adjacent the standard 12 in closed position when desired, as shown in FIGURE 3, and so that the leg unit 13 can be permitted, when desired, to be moved outwardly to supporting position by action of the coil spring 45, as illustrated in FIGURES 4 and 5.

To this end the leg unit 13 is provided with an upper collar 28 which slidably embraces the lower end portion of the tubular member 17 and with a lower collar 30 which is preferably fixedly secured adjacent the lower end of the tubular member 17. The upper collar 28 may be provided with three pairs of spaced ears 31, and the lower collar 30 may likewise be provided with three pairs of spaced ears 32, preferably spaced about the lower collar 30 in similar fashion to the ears 31 on the upper collar 28.

As best seen in FIGURES 1 and 2, a channel-shaped leg member 33 is swingably secured to each pair of ears 31 by a rivet 34. A channel-shaped bracing link 35 is similarly pivotally secured at one end to each pair of ears 32 on the lower collar 30 by rivet 36. The opposite end of each of the bracing links 35 is pivotally secured to a medial portion of its corresponding leg member 33 by a rivet 37.

Portions of the leg unit 13, thus far described, are conventional. When the leg unit 13 is swung toward closed position adjacent the standard 12, the slidable upper collar 28 moves upwardly on the tubular member 17, and the leg members 33 embracing links 35 swing inwardly about the pivot points afforded by the rivets 34, 36 and 37. Similarly, but in reverse fashion, when the leg unit 13 is moved to spread apart supporting position, the upper collar 28 slides downwardly upon the tubular member 17 and the leg members 33 embracing links 35 pivot outwardly to supporting position.

In the present invention the coil spring 25 is operatively associated with lever means, generally designated 40, and with the leg unit 13 to cause the leg unit to be automatically swung to and held in closed position adjacent the standard when the standard and leg unit are lifted from the floor, or other supporting surface. In addition, control means is provided for releasing the leg unit from its inwardly urged closed position so as to permit the lower compression spring 45 to cooperate with the lever means 40 and the bracing links of the leg unit 13, thereby causing the leg unit to be swung automatically to outwardly spread supporting position.

As herein shown, each lever means 40 is pivotally mounted between each pair of spaced ears 32 of the lower collar 30 by rivets 36. Each lever means 40 includes a free end affording an inner arm or extension 41 extending inwardly from the adjacent end of one of the bracing links 35, and each inner arm 41 projects into the lower end of the main tubular member 17 through a slot 42 in the tubular member 17. Each lever means 40 also includes an outer arm 43 which may be arcuately shaped to accommodate the lower collar 30. Each outer arm 43 preferably fits within the channel-shaped sides of one of the bracing links, and is preferably secured to its respective bracing link by a rivet 39. In order to enlarge the parts in certain of the drawings for clearance of illustration, FIGURES 2, 3 and 5 show only one of the three leg members, lever means and associated parts.

The coil spring 45 is preferably seated in the lower end of the main tubular member 17 against a cap 46. As will subsequently be described in more detail, this coil spring 45 is formed so that it is not as stiff or as strong a coil spring as is the coil spring 25. The coil spring 45 may have washers or buttons 47 or 48 secured to each of its opposite ends to afford guiding and bearing surfaces for the coil spring 45.

As best shown in FIGURE 4, the extension rod 18 is in released and upwardly disposed position so that no force has been imparted by the extension rod to the coil springs 25 and 45. In this illustration, the leg unit 13 is in outwardly spread supporting position.

In FIGURE 1, the extension rod 18 has been depressed into the standard 12 and is being held in depressed position by the clamping means 21. Referring to FIGURE 2, the inner end of the depressed extension rod 18 has compressed the coil spring 25 against the inner arms 41 of the lever means 40. The downward thrust from the coil spring 25 is tending to urge the lever means to rotate counterclockwise so as to carry the bracing links and the leg members toward closed position. However, the leg unit 13 still remains in outwardly spread supporting position because of the weight of the standard 12 and casing 16, and because the frictional forces present between moving parts and between leg members and the supporting surface are sufficient to prevent the thrust from the compressed coil spring 25 from causing counterclockwise rotation of the lever means 40.

Thus it will be noted that the extension rod 18 and the clamping member 21 afford a kind of control means. When the inner end of the extension rod 18 is pushed downwardly to engage an end of the screen casing as shown in FIGURES 1 and 2, the spring 25 is fully compressed, and the lug 23 of the bail support 22 is generally locked within the well 24 at the end of the casing 16 by the clamping member 21. This locking of the casing is done preparatory to putting the screen away in storage.

Assuming the extension rod 18 is depressed, as illustrated in FIGURES 1 and 2, when the movie screen device is lifted from its supporting surface, sufficient thrust is provided in the compressed coil spring 25 to cause counterclockwise rotation of the lever means 40 so as to move the bracing links and leg members to closed position against the standard. As seen in FIGURE 3, the rotation of the inner arms of the lever means 40 causes the coil spring 45 to also become compressed beneath the inner arms 41 as the leg members are swung to closed position adjacent the standard. This compression occurs because the coil spring 25 is a stronger spring than the coil spring 45 as previously stated.

The conditions depicted in FIGURE 3 are thus present when the screen is ready to be stored. That is, the leg unit is folded to closed position against the standard and the casing 16 is held parallel to the standard by the bail support on the extension rod.

As stated above, control means are provided to once again place the movie screen in operative position, the control means herein shown being the extension rod 18 and its clamping member 21. When the clamping member 21 is released, the coil spring 25 pushes the extension rod 18 outwardly (FIGURE 4), thus releasing the thrust or forces present in the coil spring 25 and also releasing the extension rod 18 from engagement with an end of the screen casing. When the thrust in coil spring 25 is released, the opposing thrust in compressed coil spring 45 is also released so that the upper end of the coil spring 45 engages against the underside of the inner arms 41 of the lever means 40 causing the lever means 40 to rotate clockwise. Since the outer arms 43 of the lever means 40 are secured to the bracing links 35, the clockwise movement of the lever means 40 simply swings the bracing links outwardly, and the leg members are carried outwardly to spread position by the bracing links. Thus, the structure of the present invention provides a positive automatic opening of the leg unit and a positive automatic closing of the leg unit without any necessity for manual manipulation of the leg unit in its movement either to closed or supporting position.

The foregoing detailed description has been given for clearness of understanding only and no unnecessary limitations are to be understood therefrom as some modifications will be obvious to those skilled in the art.

I claim:

1. A stand adapted to be maintained in upright position upon a supporting surface, comprising: an elongated standard; a pair of compression springs positioned at the lower end of the standard, one of the springs being positioned above the other; a plurality of leg members swingably mounted on the lower end portion of the standard for movement together between a closed position adjacent the standard and a spread supporting position in which the standard is maintained uprightly; a bracing link extending between each leg member and the lower end portion of the standard, each bracing link having one end pivotally secured to the lower end portion of the standard and the other end pivotally secured to one of the leg members; a plurality of lever members pivotally secured to the lower end portion of the standard, one lever member being provided adjacent the one end of each bracing link, each including an outer arm pivoted to its adjacent bracing link at a point spaced from the pivotal securement of the lever to the lower end portion of the standard for conjoint movement with the bracing link and an inner arm positioned between said compression springs, each inner arm of the lever members receiving thrust from the one spring when compressed and transmitting that thrust to its respective outer arm and bracing link in a direction tending to swing its bracing link toward the standard and thereby fold the leg members and the bracing links adjacent to the standard when the stand is lifted from the supporting surface, the thrust of said one spring being of sufficient magnitude to compress the other spring and create an opposing thrust in said other spring as said leg members are moved toward closed position; and control means selectively actuatable for releasing and for maintaining compression in said one compression spring, the release of thrust in said one compression spring causing the opposing thrust in said other compression spring to act on each inner arm of the lever members and to transmit said opposing thrust through each outer arm of the lever members to the bracing links so as to force the bracing links and leg members to swing outwardly toward supporting position.

2. A stand as specified in claim 1, in which the control means includes an extension rod telescoping into the standard and clamping means operable between the rod and standard for holding the extension rod in varying degrees of extended adjustment, the extension rod when depressed having an inner end compressing the one compression spring to create the thrust for compressing the other compression spring when the stand is removed from the supporting surface.

References Cited by the Examiner

UNITED STATES PATENTS

| | | | |
|---|---|---|---|
| 1,576,629 | 3/1926 | Culp | 248—435 X |
| 3,164,348 | 1/1965 | Armstrong | 248—171 |
| 3,190,597 | 6/1965 | Bieschke | 248—171 |

CLAUDE A. LE ROY, *Primary Examiner.*

JOHN PETO, *Examiner.*